June 20, 1972   B. B. HERMAN ET AL   3,671,320
BATTERY PLATE TREATMENT PROCESS
Filed Dec. 23, 1969
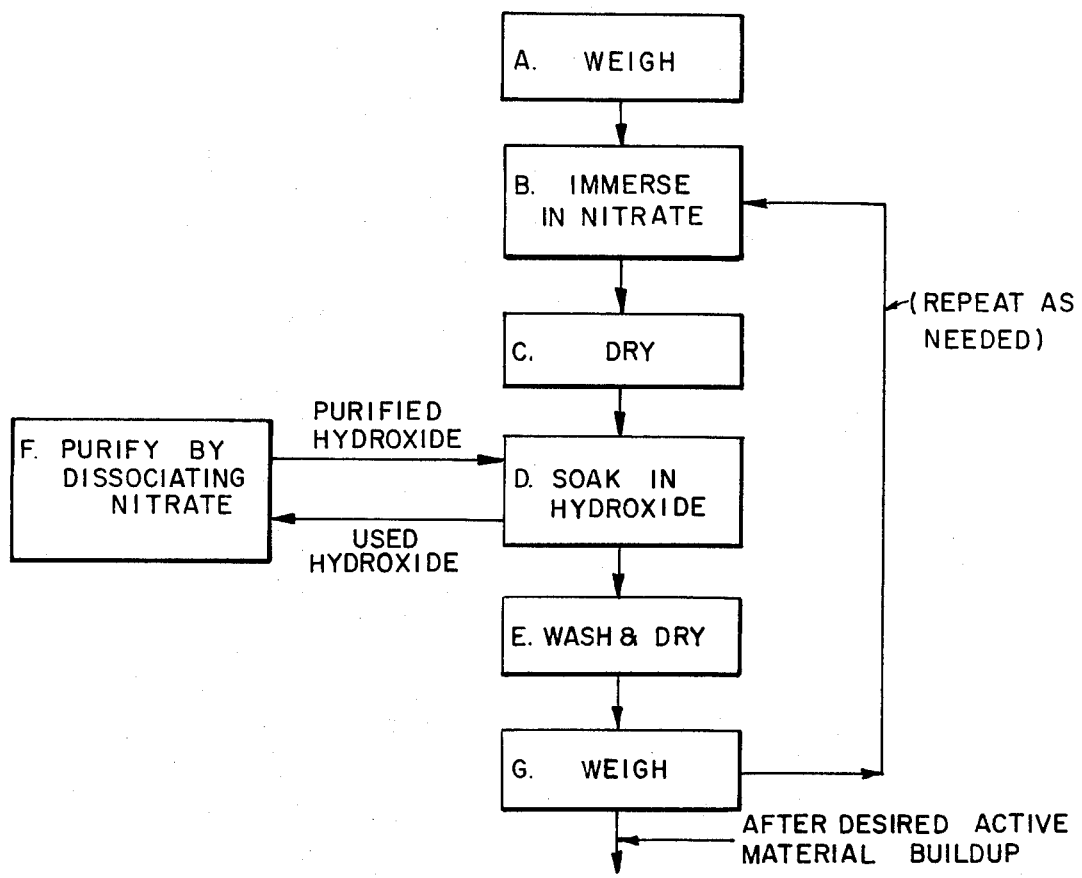
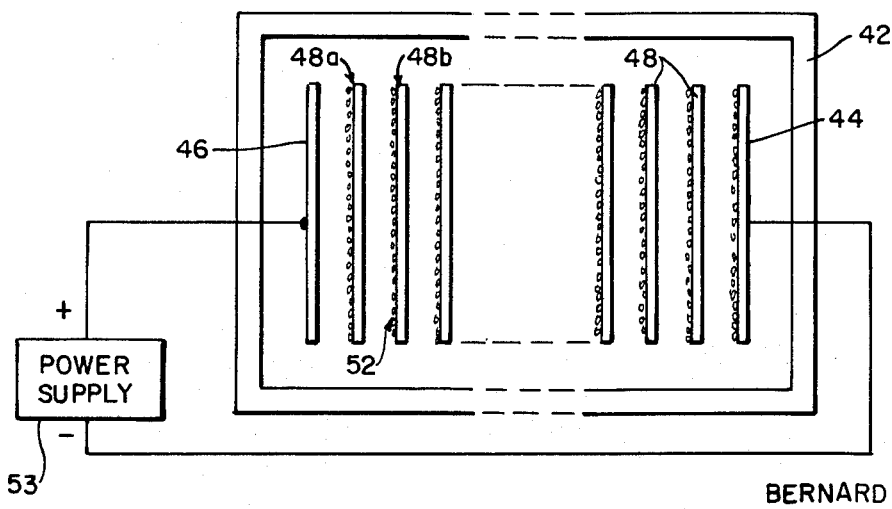
INVENTORS
BERNARD B. HERMAN
VINCENT P. FARLEY, JR.
BY
Darby & Darby
ATTORNEYS

United States Patent Office 3,671,320
Patented June 20, 1972

3,671,320
BATTERY PLATE TREATMENT PROCESS
Bernard B. Herman and Vincent P. Farley, Jr., Edison, N.J., assignors to Gulton Industries, Inc., Metuchen, N.J.
Filed Dec. 23, 1969, Ser. No. 887,549
Int. Cl. H01m 35/18, 35/30
U.S. Cl. 136—75
11 Claims

ABSTRACT OF THE DISCLOSURE

A process and apparatus for treating battery plates formed by impregnating a porous substrate with a metallic nitrate and subjecting the impregnated substrate to an alkaline earth hydroxide for formation of active material in the form of a metallic hydroxide, with formation of soluble nitrates as a by-uproduct, in which the soluble nitrates are prevented from creating contamination of the plates, by cathodizing them into ammonia and carbon dioxide gas in a tank having a pair of electrodes and one or more insulated electrically floating metallic baffle plates between the electrodes.

---

The present invention is directed toward improvements in processes and apparatus for preparing battery plates, particularly for batteries using nickel or cadmium plates, such as nickel-cadmium, nickel-iron, silver-cadmium or other batteries.

Its objects are to provide an improved electrochemical process and apparatus therefor by which impurities in the battery plates are reduced, leading to batteries with lower internal impedance, longer shelf-life, lower self-discharge rate, greater charging efficiency, less voltage decline during discharge, and longer charge-discharge cycle life. It is also an object to provide an improved electrochemical process and apparatus for eliminating nitrate, and like impurities from solutions.

These and other objects and advantages are attained without materially affecting the processing time required, and with relatively simple and inexpensive apparatus.

These and other objects and advantages will become more clearly apparent from the following description of preferred versions of the present invention taken in conjunction with the appended drawings in which:

FIG. 1 is a flow diagram of a plate impregnating cycle, showing prior practice plus the addition of a purifying step according to the present invention; and FIG. 2 is a schematic diagram of the purification or decontaminating reservoir and its electrode arrangement.

In current conventional processes for making battery plates for alkaline batteries, the positive plates are customarily made of nickel hydroxide, and the negative plates of cadmium hydroxide. In making these plates, a porous nickel substrate strip (generally produced by sintering a nickel paste on a perforated nickel sheet) is impregnated with nickel nitrate or cadmium nitrate, dried, and then treated with sodium or potassium hydroxide to convert the nitrate into a precipitated hydroxide of nickel or cadmium, as the case may be. (Hereinbelow, the process will be specifically described with respect to the nickel or positive electrode, although it will be understood that the same procedures and apparatus are applicable to the cadmium or negative electrode.)

In order to obtain the necessary amount of nickel hydroxide, which is the active material for the battery plate, the following steps are generally used, illustrated in the flow diagram of FIG. 1. The substrate is first weighed (Step A) to determine its initial weight, and it is then immersed in the nickel nitrate solution (Step B), drained and dried (Step C). Thereafter, it is immersed in an alkali metal hydroxide solution (Step D) to convert the nickel nitrate into nickel hydroxide by chemical reaction, the combination of nickel nitrate and alkali metal hydroxide producing an alkali metal nitrate and precipitated nickel hydroxide.

While either sodium or potassium hydroxide are commonly used, in the following the process will be described in terms of sodium hydroxide as illustrative. The various constituents other than nickel hydroxide are water soluble, and the plate strips are therefore washed (Step E) to remove the excess sodium hydroxide and other undesired chemical products of the reaction. After dying (Step E), the plate strips are again weighed (Step G) to determine how much nickel hydroxide has been added. Generally, this cycle of operations serving to impregnate the substrate with nickel hydroxide must be repeated a number of times, commonly from 9 to 11 times, before the desired amount of nickel hydroxide has been added. This may be of the order of an amount equal to the original weight of the substrate.

In this process, certain residual impurities or contaminants, such as sodium nitrate, may remain on the plate strip. It is important to eliminate any such contaminants, especially nitrates (to the extent possible), since, if the final battery plate contains an unduly high amount of nitrates, the resulting battery would have a high self-discharge rate and would therefore run down from a charged state even while merely resting on the shelf. It would also be difficult to charge and would have a poor charging efficiency, in that a relatively low portion of the charging ampere-hours applied would be stored in the battery. Also, these nitrates create a marked temperature rise during charging, and lower the voltage existing at the end of the charging operation. In addition, the internal impedance of the battery is increased.

For practical purposes, the sodium hydroxide solution is reused, possibly up to 30 times, by immersing successive loads of plate strips in the same bath, each undergoing an impregnation cycle. It will be appreciated that, when the impregnation cycle is being performed, the nickel nitrate may be only partially converted to nickel hydroxide by the sodium hydroxide bath in any one cycle. The sodium nitrates formed, being soluble in water, remain in the bath, as do some other impurities. As the impregnation cycles are repeated, the bath increases its concentration of impurities, as well as of nickel nitrates which may be washed out of the plate. For example, the sodium hydroxide solutions may have a sodium nitrate concentration of the order of 5,000 parts per million after the first cycle, which may increase to possibly 400,000 parts per million after 30 cycles. The greater concentration of impurities in the bath increases the likelihood that impurities, such as sodium nitrates, will remain on the plates or be retained within their pores despite washing steps, and also reduces the effectiveness and rate of the conversion of nickel nitrate into nickel hydroxide.

The present invention is specifically directed toward economical and practical means for maintaining a low impurity concentration in the sodium bath. According to one aspect of the present invention, as described in more detail below, contamination of battery plates by such impurities, and their resulting disadvantages, are greatly reduced by treating the sodium hydroxide bath to remove a substantial portion of the impurities between successive impregnation cycles (Step F, FIG. 1). This prevents the impairment of the rate of conversion of the nickel nitrate into nickel hydroxide, which would otherwise occur if the concentration of nitrates in the sodium hydroxide bath increases after successive impregnation cycles.

According to an illustrative form of the present invention, the sodium hydroxide bath for each immersion (Step D) is supplied from a sodium hydroxide reservoir. While the bath proper is acting upon the battery plates, the bath material in the reservoir is subjected to a decontamination operation. A steady circulation between bath and reservoir is preferably maintained, so that as the bath material picks up impurities, these impurities circulate to the reservoir where they are continuously eliminated. Alternatively, the bath may be emptied into the reservoir after each immersion step, and refilled from the reservoir for the next immersion step. The elimination of the impurities is effected by an electrochemical process by which the nitrates are dissociated into ammonia gas, and carbonates are dissociated into carbon dioxide gas, the gases being driven out of the reservoir and thereby removed from the reservoir-to-bath cycle.

In a represenative production line, a sodium hydroxide bath of 200 gallons capacity may be used for treating the battery plate strips. Such a tank may be coupled to a reservoir containing 400 gallons, from which the solution is taken for the treatment tank. At the first converting step, approximately two pounds of undesired sodium nitrate is produced for each pound of nickel nitrate in the battery plate strips. This would represent about 5,000 parts per million of nitrate in the sodium hydroxide solution. As the sodium hydroxide solution is reused for successive converting steps, after 5 cycles, there would be about 30,000 parts per million of sodium nitrate, and after 30 cycles, about 400,000 parts per million. This sodium nitrate cannot be fully washed from the battery plates and cannot be readily removed by precipitation or cooling, because it is highly soluble. Converting the nitrates into insoluble materials and filtering has provide to be an impracticable process.

According to the present invention, the contaminated sodium hydroxide is treated while it is in the reservoir tank, and notwithstanding that the solution may circulate between the reservoir tank and the treatment tank bath. The treatment to eliminate the nitrate contamination is performed by passing an electric current through the reservoir contents, to dissociate the nitrates into ammonia gas, and the carbonates into carbon dioxide, and withdrawing the gases produced. The remaining liquid is then essentially decontaminated and may be re-used.

A sodium nitrate solution in water will be dissociated by a current flowing through it, into ammonia gas, so long as the dissociation voltage of about 2½ volts is exceeded. The rate of dissociation is determined essentially by the current; increase in voltage (without increase in current) has little effect, except that at above about 4 volts, the water solvent will dissociate into oxygen and hydrogen. This latter dissociation is non-productive and energy-consuming, so that generally voltages between 2½ and 4 volts should be used. A voltage af about 3 volts has been found useful.

However, the high currents required offer a practical problem, due to the cost and complexity of the power supply equipment required. One way to attack this problem is by series connection of a multiplicity of nitrate dissociation cells, permitting use of higher voltages for the same current. However, the complexity and cost of providing such cells and connecting them in high-current circuit is prohibitive.

The present invention provides a simple and effective means for attaining the effect of a number of high-current low-voltage cells in series, without the complexity of constructing or connecting a multiplicity of individual cells.

According to the present invention, a single tank is provided with but two electrodes, in the form of two spaced parallel metallic sheets, one at each end of the tank. Between these sheets are placed a series of parallel closely spaced metallic sheets, insulated from one another and from the electrodes. These insulated sheets may be termed baffle sheets. The liquid in the tank, being electrically conductive, creates a voltage gradient between the electrodes. The interposition of the baffle sheets does not affect this gradient, since the baffle sheets are disposed perpendicular to the potential field lines. The result however is that a potential difference exists between each pair of adjoining baffle sheets, without any terminals on them or electrical connections to them. Each space between an adjoining pair of the baffle sheets (or between an electrode and the adjacent baffle sheet) acts as a single cell, affording a large surface area corresponding to substantially the entire cross-sectional area of the tank. The effect is that of a series-connected array of electrochemical cells, provided in an extremely simple manner.

FIG. 2 shows in diagrammatic form one arrangement of the reservoir and decontaminating apparatus. The reservoir is formed by a tank 42 which has a pair of main electrode plates 44 and 46, one at each end. Intermediate these main plates 44, 46 is a series of baffle plates 48. Each of the intermediate baffle plates 48 is suitably insulatedly supported within the tank, as by being suspended therein, and is maintained insulated from both the remaining baffle plates 48 and electrode plates 44 and 46. The main electrode plates 46 and 44 are connected to a power supply 52 which applies positive potential to one of the main plates, such as 46, and negative potential to the other plate, such as 44, and thereby produces a voltage gradient within the tank 42 between the plates 44 and 46. Each adjoining pair of plates 48a and 48b, thereby has a potential difference between them, formed by a type of voltage-dividing action within the electrolyte contained in the tank. By maintaining this inter-plate potential difference at a value in excess of about 2½ volts, there is sufficient electric potential to convert the sodium nitrate in the bath into ammonia gas which bubbles off at the face of each of plates 48 facing in the direction of the positive electrode 46, as indicated at 62. At the same time, carbonate ions are dissociated to form carbon dioxide gas, which similarly is removed from the circulatory system.

From one point of view, each plate 48 is a bipolar electrode. In the illustrative example of FIG. 21, its left surface is a negative electrode (in relation to the plate to its left) and its right surface is a positive electrode (in relation to the plate on its right). The potential difference between adjoining plates 48 is determined by the overall voltage of power supply 52, the number of baffle plates, and their separation. By placing the baffle plates 48 at appropriate distances from one another, the same effect is created as though each of the plate pairs was itself connected to a power supply. However, only one power supply is required, with only one pair of connections, and it becomes extremely simple both to fabricate the arrangement and to replace plates where desired, since no electrical connections are required to the intermediate plates.

Any desired number of baffle plates may be used. In one example, electrode plates 44, 46 were spaced 12 inches, and each had a surface of 3 feet by 6 feet. Between these electrode plates were placed two baffle plates, each also 3 feet by 6 feet in area, and spaced 4 inches from each other and from the electrode plates. A power supply provided 9½ volts across plates 44, 46 and passed 2,500 amperes through the bath. Ammonia gas was produced at the negative electrode 44, and at the left-hand (as viewed in FIG. 2) surface of each baffle plate. The liquid was continuously circulated between the treatment tank and the decontaminating tank at a rate of about 2000 gallons per minute, which substantially eliminated all nitrates produced during the impregnating cycle, keeping the bath substantially at its initial sodium hydroxide concentration by reconverting the sodium nitrates to sodium hydroxide. Any loss of water due to evaporation or dissociation can readily be made up as needed, by addition to the reservoir tank.

By this baffle plate arrangement, the surface area in the reservoir in contact with the electrolyte, at which the electrochemical dissociating reaction occurs, is multplied over what would be possible with only a single pair of plates. At the same time, no greater complexity of power supply or electrical system is required.

This apparatus therefore acts continuously to eliminate nitrates, carbonates and like impurities from the reservoir. Since the active bath is circulated through the reservoir, it will be apparent that the arrangement lowers the impurity concentration, as is desired and by appropriate design, the dissociation of the impurities in the reservoir bath can be correlated to the rate of production of the impurities in the battery plate strip chemical conversion cycle, so as to essentially maintain the impurity concentration at a minimum value. This in turn lowers the nitrate and other impurities retained on the battery plate strips, and reduces the harmful contamination in the finished battery plates. At the same time, the concentration of sodium hydroxide in the chemical conversion bath is maintained at higher level for succeeding impregnating cycles, so as to enhance the effectiveness of conversion of nickel nitrate to active nickel hydroxide. This in turn reduces the number of impregnating cycles needed to build up the desired amount of active material on the porous nickel carrier strip.

It will be understood that the present decontaminating arrangement is not restricted to use in battery plate production, but may be used generally wherever electrochemical dissociation with a gaseous output or by-product may be used. By the simple device of adding the electrically floating baffle plates, the rate of production of gases by cathodization is markedly increased, effectively multiplying electrode area without any electrical connections.

The overall result is an improved battery plate having less contamination, leading to improved battery performance, coupled with a more efficient production of such plates.

It will be understood that the foregoing description is directed principally to the principles of the present invention, and that many different structures and modes of accomplishing those principles will be readily apparent to those skilled in the art. The scope of the invention is therefore not to be deemed limited by the foregoing description, but is defined by the appended claims.

What is claimed is:

1. In a process for preparing battery plates comprising the steps of successively
   (a) immersing a porous substrate in a nitrate solution,
   (b) drying said substrate to leave nitrate adhered thereto,
   (c) immersing said dried substrate in an alkaline earth hydroxide solution to convert said nitrate into a hydroxide and forming soluble nitrates in said solution,
   (d) washing and drying said substrate, and
   (e) repeating the foregoing steps until a desired amount of hydroxide is produced,
the improvement comprising reducing the concentration of said soluble nitrates in said solution by passing through said solution an electric current at a potential above the nitrate dissociation potential to convert said nitrates into ammonia gas.

2. The process as in claim 1 wherein said nitrate is selected from the group consisting of nickel nitrate and cadmium nitrate.

3. The process as in claim 1 wherein said alkaline earth hydroxide is selected from the group consisting of potassium hydroxide and sodium hydroxide.

4. The process as in claim 3 wherein said metallic nitrate is selected from the group consisting of nickel and cadmium nitrates.

5. The process as in claim 4 wherein said nitrate-removing step comprises
   (a) passing said solution into a reservoir,
   (b) passing electric current through said reservoir at a potential above the nitrate dissociation potential to convert said nitrates into ammonia gas.

6. The process as in claim 5 wherein said nitrate-removing step comprises
   (a) passing said solution into a reservoir having a pair of opposed electrodes immersed in said solution,
   (b) interposing a set of parallel metallic baffle plates between said electrodes and immersed in said solution and insulated from said electrodes and from one another, and
   (c) passing electric current through said solution by applying to said electrodes a voltage at least as large as the dissociation potential of nitrates into ammonia gas multiplied by one more than the number of said baffle plates.

7. The process as in claim 6 further comprising continuously circulating said solution from said immersing step (C) to said reservoir and back simultaneously with the conversion into hydroxide.

8. A process for decontaminating a liquid having contaminants electrically dissociable to form a gas by product comprising
   (a) placing said liquid in a reservoir having a pair of electrodes and at least one metallic baffle plate between said electrodes and electrically insulated from said electrodes and each other, with said liquid in contact with said electrodes and at least one metallic baffle plate,
   (b) passing an electric current through said liquid from one electrode to the other and through at least one said baffle plate by applying a potential to said electrodes, and
   (c) said potential being at least equal to the dissociation potential of said contaminants.

9. A process as in claim 8 wherein said contaminants are members of the class consisting of nitrates and carbonates.

10. A process as in claim 9 wherein said current is passed by applying a voltage to said electrodes at least as large as 2½ times one more than the number of baffle plates.

11. A process as in claim 10 wherein said voltage is about three times one more than the number of baffle plates.

References Cited

UNITED STATES PATENTS

| | | | |
|---|---|---|---|
| 1,269,078 | 6/1918 | Hamilton | 204—269 |
| 1,301,832 | 4/1919 | Gerber | 204—254 X |
| 2,899,480 | 8/1959 | Fleischer | 136—67 |
| 2,952,570 | 9/1960 | Heuninckx | 136—24 X |
| 3,228,795 | 1/1966 | Ackermann | 136—29 |
| 3,281,272 | 10/1966 | Ackermann et al. | 136—29 |
| 3,061,537 | 10/1962 | Yagishita | 204—275 |
| 3,324,023 | 6/1967 | Kircher | 204—256 |
| 3,457,151 | 7/1969 | Kortejarvi | 204—130 |
| 896,555 | 8/1908 | Landis | 204—268 |

ANTHONY SKAPARS, Primary Examiner

U.S. Cl. X.R.

136—76, 78